United States Patent [19]  [11] 3,775,986
Daughtry  [45] Dec. 4, 1973

[54] METHOD AND APPARATUS FOR MAKING REMOTE PIPELINE CONNECTIONS
[75] Inventor: Arthur C. Daughtry, Houston, Tex.
[73] Assignee: Esso Production Research Company, Houston, Tex.
[22] Filed: Apr. 27, 1972
[21] Appl. No.: 248,077

[52] U.S. Cl. .................................. 61/72.3, 166/.6
[51] Int. Cl. ........ F16l 1/00, E02b 3/16, F16l 35/00
[58] Field of Search ........................... 61/72.3, 72.1; 166/.5; 29/237

[56] References Cited
UNITED STATES PATENTS
3,701,261  10/1972  Nolan, Jr. .................... 61/72.3
3,591,204  7/1971  Shipes .................................. 166/.6
3,604,731  9/1971  Petersen .............................. 166/.6
3,693,350  10/1972  Petersen ......................... 61/72.3 X
3,592,014  7/1971  Brown .................................. 166/.6

Primary Examiner—Jacob Shapiro
Attorney—James A. Reilly et al.

[57] ABSTRACT

An underwater pipeline is connected to a submerged production system or other underwater equipment by pulling the end of the pipeline into a manipulating structure installed adjacent the underwater equipment, moving the end of the pipeline into a predetermined position with respect to a corresponding pipe to which the pipeline is to be connected, lowering a remote connector into place adjacent the ends of the pipeline and corresponding pipe, and thereafter actuating the remote connector.

19 Claims, 15 Drawing Figures

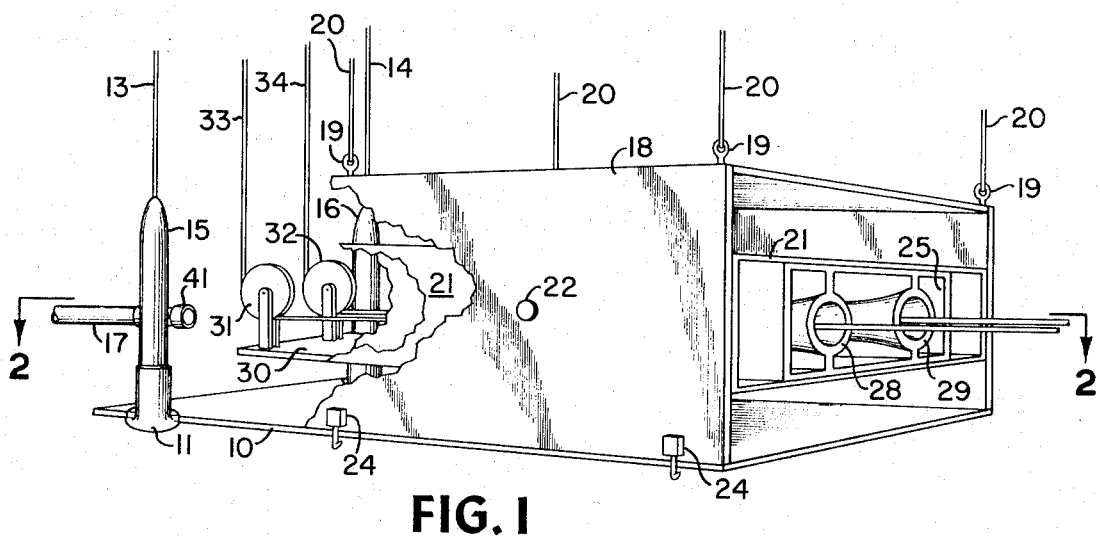
FIG. 1
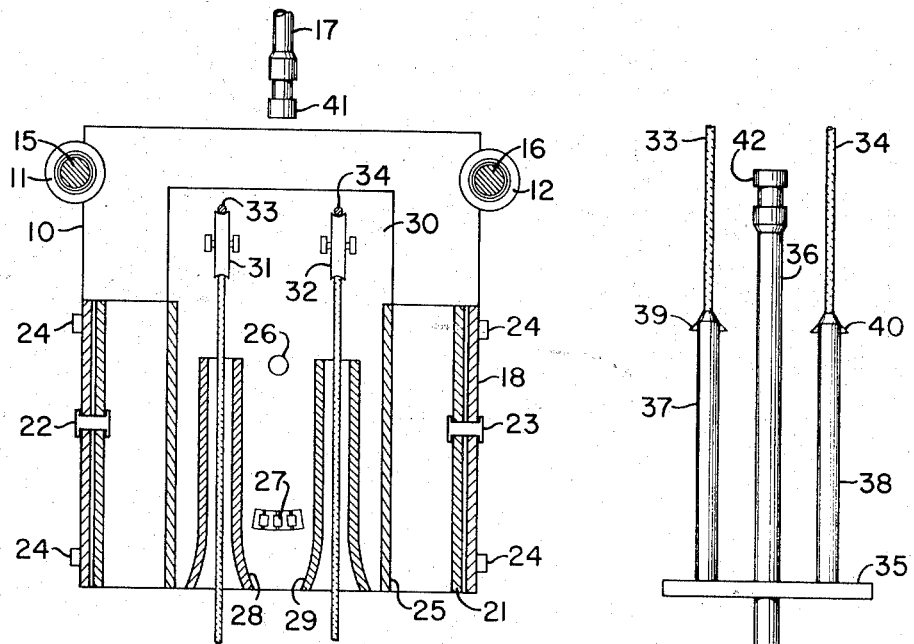
FIG. 2
FIG. 3

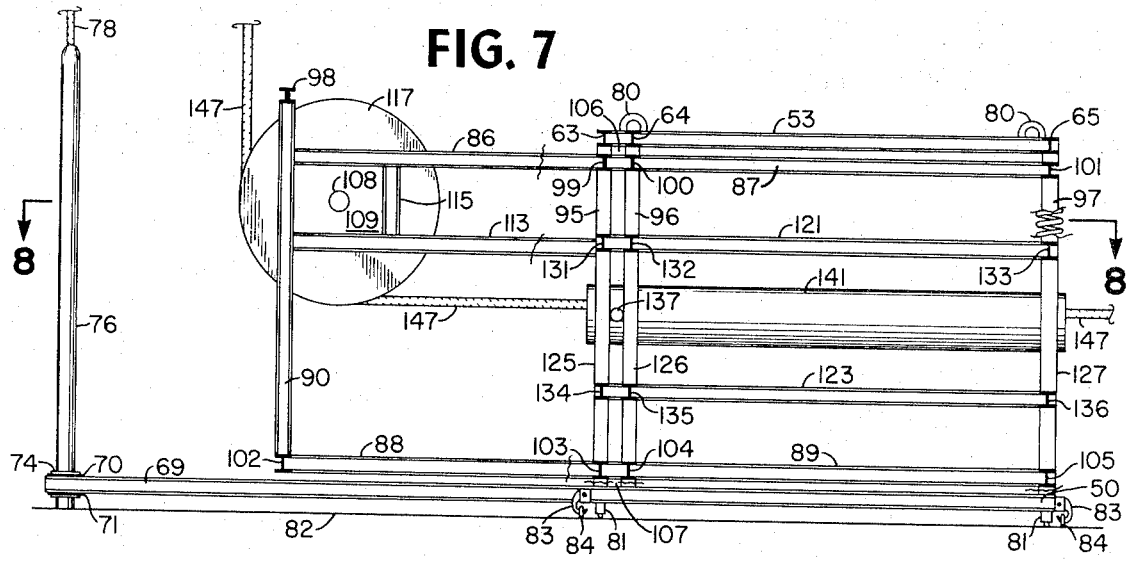
FIG. 7
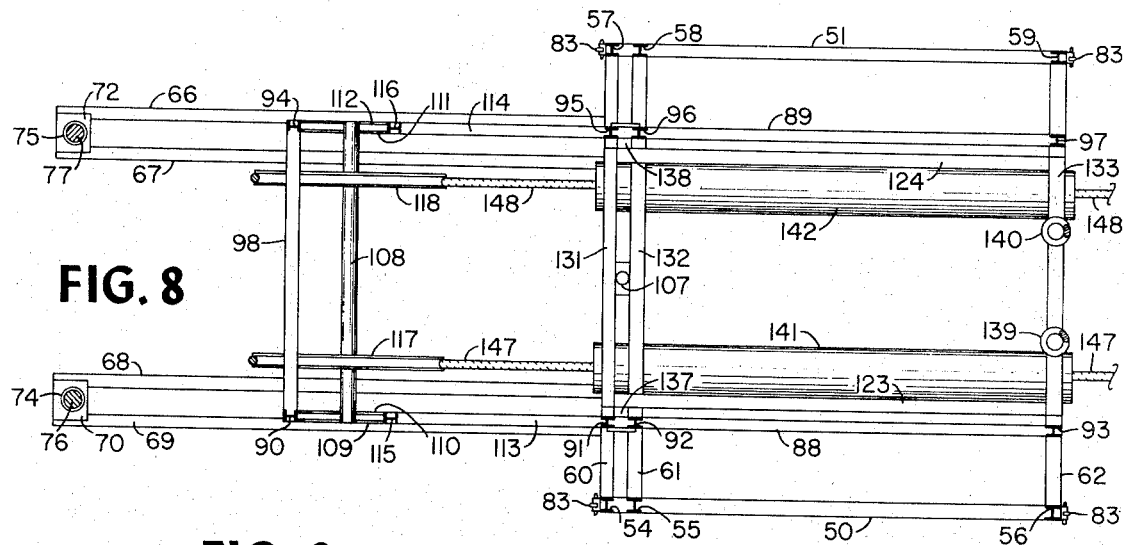
FIG. 8
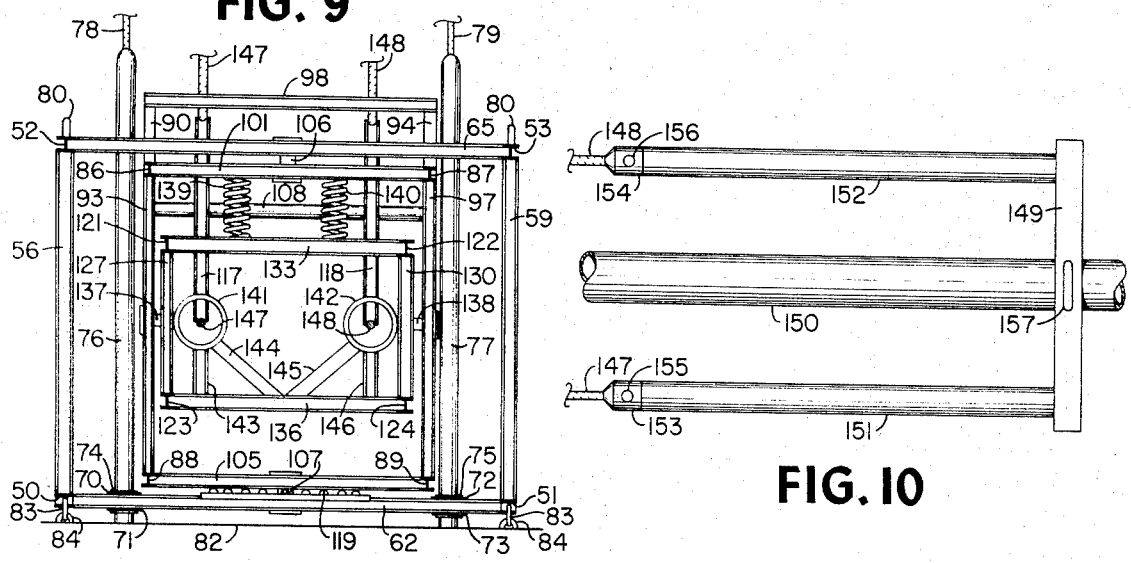
FIG. 9
FIG. 10

METHOD AND APPARATUS FOR MAKING REMOTE PIPELINE CONNECTIONS

BACKGROUND OF THE INVENTION

1. Field of the Invention

This invention relates to the connection of pipelines in place at underwater installations and is particularly concerned with a method and apparatus for connecting flowlines and the like to underwater wellheads and other submerged equipment without the use of divers.

2. Description of the Prior Art

The discovery of offshore crude oil and natural gas reservoirs in water depths beyond those at which divers can operate effectively for long periods has emphasized the need for systems for connecting oil and gas flowlines to underwater wellheads and other submerged production equipment that can be remotely controlled from a floating vessel or fixed platform extending above the water's surface. Although remote connectors that can be actuated mechanically or hydraulically have been developed, studies indicate serious drawbacks that may often make the use of such devices impractical. Most remote connectors presently available require careful alignment of the pipe on which they are to be installed. Pipe of relatively small diameter can generally be aligned without difficulty but movement of the end of a long string of large diameter pipe to permit its precise alignment with the equipment to which it is to be connected constitutes a serious problem, particularly in deep water where diver assistance is unavailable.

SUMMARY OF THE INVENTION

This invention provides an improved method and apparatus for connecting pipelines to wellheads and other underwater equipment which avoids many of the difficulties apt to be encountered with systems proposed in the past. The system of the invention employs a manipulating structure which can be lowered into place adjacent the wellhead or other underwater equipment before the connection is made. One embodiment of this manipulating structure includes an outer framework or housing within which are mounted intermediate and inner frameworks, one of which is arranged to pivot about a horizontal axis and the other of which is designed to pivot about vertical axis. The inner framework includes one or more generally horizontal guide funnels which are aligned with sheaves mounted near the end of the apparatus facing the wellhead or other underwater installations. Lines are extended through the guide funnels and sheaves from the underwater pipeline to the surface platform or vessel before the apparatus is lowered into place on the ocean floor. A pulling yoke provided with horizontal guide posts to which the lines are attached is mounted near the end of the pipeline.

In using the apparatus of the invention, the manipulating structure is first lowered on guide lines to a previously installed base plate and latched into position adjacent the wellhead or other installation to which the pipeline is to be connected. After the manipulating structure is in place, the lines extending from the pulling yoke on the pipeline through the guide funnels and sheaves of the structure to the platform or surface vessel from which the operation is to be carried out are pulled from the surface until the guide posts on the pulling yoke have been seated in the guide funnels of the structure. As the posts enter the funnels, the inner and intermediate frameworks of the manipulating structure will pivot on the horizontal and vertical axes. The pipeline is then lifted by means of one or more lines installed at the surface and manipulated until the intermediate and inner frameworks on the manipulating structure have been locked into place. At this point, the end of the pipeline will be properly positioned with respect to the corresponding pipe on the wellhead or other underwater equipment. A remotely operated connector can then be lowered into position adjacent the two ends and actuated. This system alleviates difficulties encountered in aligning large diameter pipelines in deep water, is simpler and easier to operate than systems employed in the past, permits the making of connections without the use of divers, and is generally somewhat less expensive than other systems.

BRIEF DESCRIPTION OF THE DRAWINGS

FIG. 1 in the drawing is an enlarged perspective view of one embodiment of the manipulator assembly, partially in section, showing the guide funnels and other features of the apparatus;

FIG. 2 is a cross sectional view of the apparatus of FIG. 1 taken about the line 2—2;

FIG. 3 depicts the pulling yoke used with the apparatus of FIGS. 1 and 2;

FIG. 7 is a vertical view, partially in section, of an alternate embodiment of the invention;

FIG. 8 is a horizontal cross section through the apparatus of FIG. 7 taken about the line 8—8 in FIG. 7;

FIG. 9 is an end view of the apparatus of FIGS. 7 and 8;

FIG. 10 depicts the pulling yoke employed with the apparatus of FIGS. 7 through 9;

DESCRIPTION OF THE PREFERRED EMBODIMENTS

Figures 4, 5:
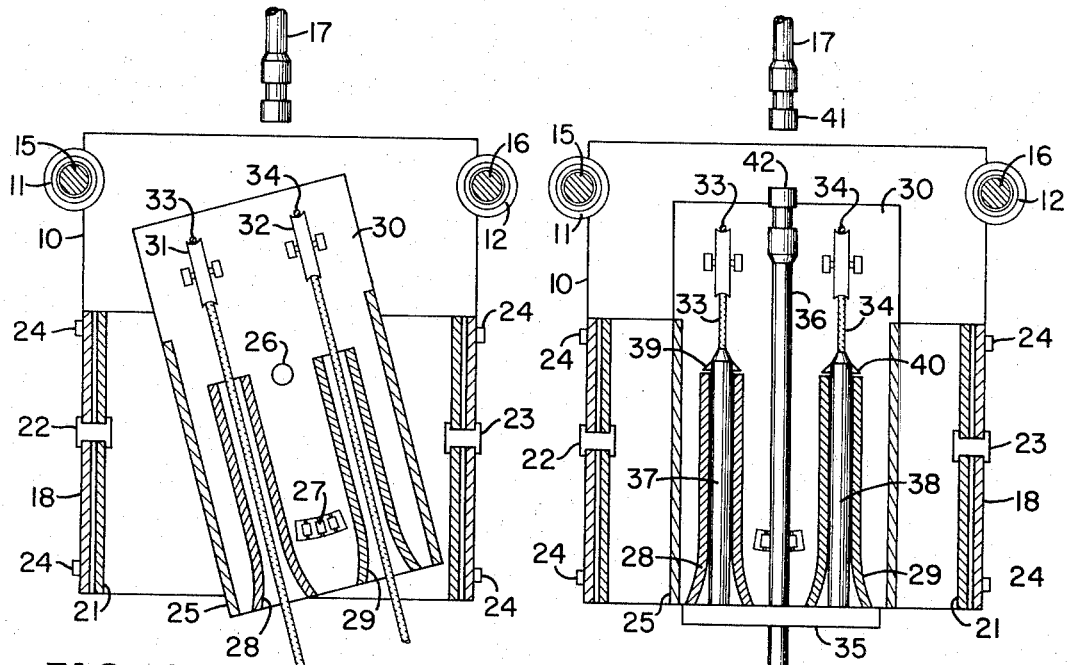
FIG. 4 is a cross sectional view similar to FIG. 2 which shows rotation of the inner framework of the apparatus as the pipeline is pulled into place.
FIG. 5 is a cross sectional view similar to FIG. 4 after the guide posts on the pulling yoke have been seated in the guide funnels.

The manipulator assembly shown in FIG. 1 of the drawing includes a horizontal base plate 10 of steel or similar material near one end of which are mounted vertical guide funnels 11 and 12. The two guide funnels, which are open at both ends and are flared outwardly at the bottom as indicated in the drawing, are designed to slide downwardly over guide lines 13 and 14 and guide posts 15 and 16 as the assembly is lowered into place from an offshore platform or floating vessel. The guide posts are mounted on a previously installed guide base, not shown in FIG. 1, which is located adjacent an underwater wellhead or similar installation from which a pipe 17 to which the pipeline is to be connected extends. The guide lines extend upwardly from the upper ends of the guide posts to the surface of the water and are connected to winches aboard the platform or vessel from which operations are being carried out. The guide base will normally be installed with the wellhead or other underwater equipment and may be of conventional design.

An outer framework or housing 18 of steel or the like is mounted on the opposite end of base plate 10 from the guide funnels 11 and 12. This housing is shown in FIG. 1 as a box-like structure but, as will become apparent later, may instead be an open framework fabricated from structural steel members, pipe, or the like. Padeyes or simiar members 19 are provided near the upper corners of the outer housing for lowering the apparatus into position by means of cables 20. An intermediate housing or framework 21 is mounted within the outer housing or horizontal axles 22 and 23. An indicated in FIGS. 1 and 2, the intermediate housing extends over substantially the entire width of the outer housing but is not as high as the outer housing. The horizontal axles permit limited rotation of the intermediate structure within the outer housing. As in the case of the outer housing, the intermediate housing may be constructed from plates as shown or can be an open framework made of pipe, channels, or simiar structure steel members. Bearings may be provided in the housing wall to facilitate movement of the intermediate structure about horizontal axles 22 and 23 if desired. Latches 24 on the outer housing permit latching of the structure in place.

An inner framework or housing 25 is positioned within the intermediate housing and supported by vertical axles 26, only one of which appears in the drawing. This inner housing is of substantially the same height as the inside of the intermediate housing but is considerably narrower. This makes possible limited rotation of the inner housing within the intermediate housing in the horizontal plane. Bearings 27 are provided in the floor of the inner housing to reduce friction between the inner and intermediate structures. Horizontal guide funnels 28 and 29 are mounted in the inner housing near the back thereof. The floor 30 of the inner housing extends forward beyond the front of the intermediate housing and supports vertical sheaves 31 and 32. Pulling cables 33 and 34 extend through the horizontal guide funnels, pass under the sheaves, and extend to the water's surface. The ends of the pulling cables beneath the water are attached to a pulling yoke 35, shown in FIG. 3 of the drawing. This yoke is mounted near the end of the pipeline 36 and is provided with arms 37 and 38 which extend parallel to the pipeline. Dogs 39 and 40 are mounted near the ends of the arms to lock the yoke in place after it has been seated in the horizontal guide funnels. The dogs snap outwardly after the ends of the arms emerge from the funnels and thus hold the assembly in place. The ends of pipe 17 and pipeline 36 are provided with fittings 41 and 42 on which the remote connectors to be employed may be seated. The length of the pipeline extending beyond the yoke is such that the end of the pipeline will be properly spaced from the end of pipe 17 when the yoke is seated.

The apparatus described above is employed for the installation of an underwater pipeline at a submerged wellhead or other installation by first mounting yoke 35 at the proper position near the end of the pipeline and attaching a fitting 42 for the particular type of connector to be employed. This may be done on a laybarge or similar vessel while the end of the pipeline is suspended above the water's surface or, if the pipeline is to be installed by the bottom-pull method, onshore before the end of the pipeline is launched. The ends of cables 33 and 34 are attached to arms 37 and 38 and one or more lifting cables is connected to the pipeline behind the yoke. The pipeline can then be lowered back into place on the ocean floor or, with the bottom-pull method, launched into the water. After this has been done and the end of the pipeline with the yoke on it has been positioned reasonably close to the underwater installation, the manipulator assembly is suspended by means of cables 20 from the platform or vessel from which the pipeline connecting operation is to be carried out. Guide lines 13 and 14 are passed upwardly through vertical guide funnels 11 and 12, pulled taut, and secured aboard the platform or vessel. The free ends of pulling cables 33 and 34 are passed through horizontal guide funnels 28 and 29, positioned beneath sheaves 31 and 32, and connected to winches onboard the platform or vessel. The assembly is then lowered into place on the guide lines until the vertical guide funnels have passed downwardly over guide posts 15 and 16 on the base plate and the apparatus is positioned adjacent pipe 17 to which the pipeline is to be connected. As the assembly is lowered, slack may be taken up in cables 33 and 34 to keep the cables on the sheaves and avoid cable entanglement difficulties. An underwater lighting and television system or other monitoring equipment, not shown in the drawing, will normally be mounted on the assembly or lowered separately to permit checking of the position of the equipment as it is lowered and provide a means for ascertaining that the assembly is in the proper final position at the end of the lowering operation. The latches or hooks 24 on the outer housing are pushed aside by pad-eyes or similar members on the guide base, not shown, as the manipulator assembly nears the base and fall back into place to lock the assembly in position as the apparatus comes to rest. This prevents unwanted movement of the assembly during later phases of the operation.

After the manipulator assembly has been positioned on the guide base as described above, the pulling of the pipeline into position can be commenced. Cables 33 and 34 are pulled taut by means of winches on the platform or vessel from which the operation is being carried out and the end of the pipeline and pulling yoke are slowly moved into position. As the cables are pulled in, the intermediate housing 21 will normally tip downwardly at the back of the manipulator assembly to minimize contact between the moving cables and the horizontal guide funnels. If the end of the pipeline 36 and pipe 17 are not aligned, the inner housing 25 will pivot about axle 26 as shown in FIG. 4 of the drawing to permit a direct pull on the pipeline and yoke. Pulling of the pipeline is continued until arms 37 and 38 on the yoke move into the horizontal guide funnels and the yoke seats against the back of the manipulator assembly as shown in FIG. 5 of the drawing. Dogs 39 and 40 on the forward ends of the arms will snap into place as they emerge from the guide funnels, thus locking the yoke into place. During the pulling operation thus carried out, it will normally be preferred to lift the end of the pipeline a short distance above the bottom by means of the lifting cables attached earlier. This reduces drag of the line on the ocean floor and permits better control of the pulling operation. Once the yoke has been seated, fittings 41 and 42 on the ends of pipe 17 and pipeline 36 will be properly spaced to accommodate the remote connecting device to be employed but will not necessarily be in proper alignment. The ends can be aligned after the yoke has been seated by use of the lifting cables to move the portion of the pipeline behind the manipulator assembly to the left or right and up or down as required. The underwater television system or other equipment used to monitor lowering of the manipulator assembly into position can be employed to facilitate this. As will be pointed out hereafter, means can also be provided to lock the manipulator into a position such that the two ends will be in alignment.

Figure 6:
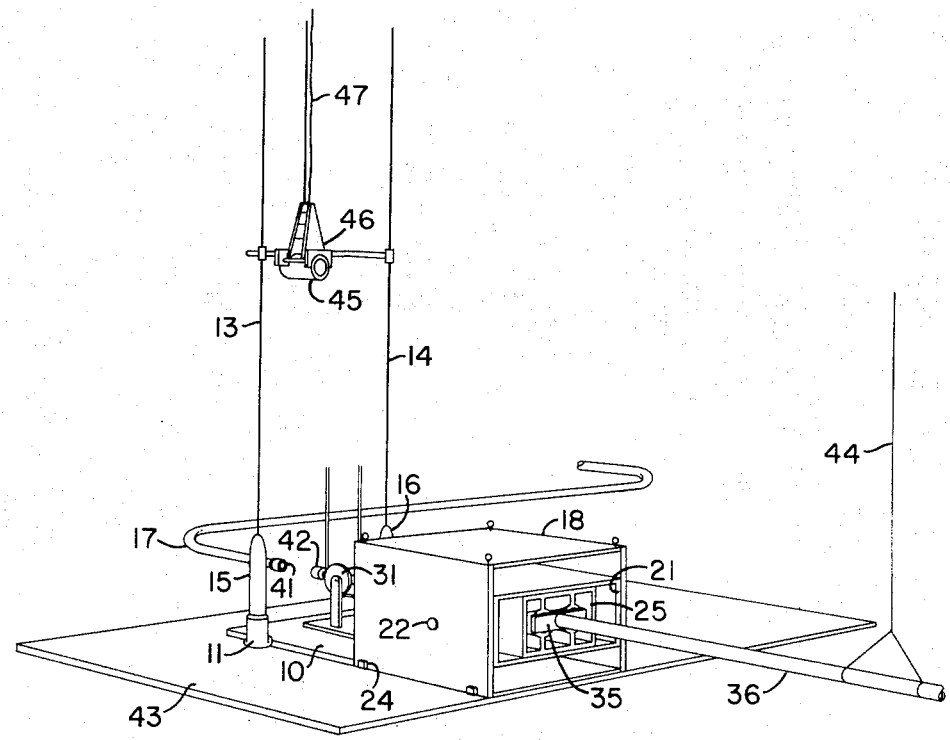
FIG. 6 is a perspective view of an underwater installation as a remotely operated connector is lowered into place for use with the apparatus of FIGS. 1 through 5.

FIG. 6 in the drawing depicts the manipulator assembly in position on guide base 43 with the end of pipeline 36 held by lifting cable 44 so that the end of the pipeline is properly aligned with the end of pipe 17. A hydraulically actuated remote connector 45 is being lowered into place on guide lines 13 and 14 by means of running tool 46. The remote connecting device and running tool are of conventional design and are available commercially. The connector is lowered until the arms on the running tool engage the pipe ends. If necessary, the end of pipeline 36 can be moved by means of one or more cables 44 to secure more precise alignment and permit seating of the connector and running tool. Once the apparatus has been seated, hydraulic fluid introduced by line 47 actuates the connector so that fittings 41 and 42 on the pipe ends are engaged and a seal is formed. The remote connector will normally include means for testing the connection to insure that proper seals have been obtained. Continuous monitoring by underwater television or other means also helps insure proper makeup of the connection. After the connection has been made and tested, the running tool is disengaged in the conventional manner and withdrawn to the surface. The guide lines 13 and 14 can then be disengaged from the apparatus and cable 44 can be removed by means of a cutting device lowered on the cable.

FIGS. 7 through 13 in the drawings depict an alternate embodiment of the invention which is similar to that shown in FIGS. 1 through 6 but includes additional features. The apparatus of FIGS. 7 through 9 includes an outer framework constructed of wide flange beams or similar structural steel members. This framework includes a rear section made up of lower longitudinal members 50 and 51, upper longitudinal members 52 and 53, right side vertical members 54, 55 and 56, left side vertical members 57, 58 and 59, bottom cross members 60, 61 and 62, and top cross members 63, 64 and 65. The front section of the outer framework includes longitudinal members 66, 67, 68 and 69. These longitudinal members are joined at the front by plates 70, 71, 72 and 73 in which guide sleeves 74 and 75 are mounted. The inside diameters of the guide sleeves are such that the sleeves will slide downwardly over guide posts 76 and 77 without difficulty. Guide lines 78 and 79 extend upwardly from the guide posts to the water's surface and may be mounted in sockets which permit their ready removal following use of the apparatus. Padeyes or similar members 80 are installed on the upper corners of the outer framework for the attachment of cables used in lowering the apparatus into place from a platform or floating vessel. Legs 81 on the lower corner support the apparatus a predetermined distance above a base plate 82 previously installed on the ocean floor adjacent the underwater wellhead or other installation to which the pipeline is to be connected. Latches 83 are provided at the lower corners for holding the apparatus in place after it has been lowered into the proper position. These latches are pushed aside by padeyes or similar member 84 on the base plate and fall back into place under their own weight. Other latching mechanisms may be employed in lieu of these devices.

The intermediate housing of the apparatus of FIGS. 7 through 9 includes upper longitudinal members 86 and 87, lower longitudinal members 88 and 89, right side vertical members 90, 91, 92 and 93, left side vertical members 94, 95, 96 and 97, top cross members 98, 99, 100 and 101, and bottom cross members 102, 103, 104 and 105. The intermediate housing is connected to the outer housing by means of vertical axles 106 and 107. These axles are held in place between cross members 99 and 100 and 103 and 104 on the intermediate housing and cross members 60 and 61 and 63 and 64 on the outer housing. This permits limited horizontal rotation of the intermediate housing within the outer housing. As can be seen from FIG. 7, the foremost vertical members 90 and 94 on the intermediate housing extend upwardly above the rest of the housing and support cross member 98. Horizontal axle 108 is mounted on the intermediate housing and held in place by plate 109, 110, 111 and 112. These in turn are supported by braces 113, 114, 115 and 116. Sheaves 117 and 118 are positioned on axle 108 near the outer ends of the axle and move with the intermediate housing. Bearings 119 are mounted between lower horizontal member 62 on the outer housing and lower horizontal member 105 on the intermediate housing to help support the intermediate housing and reduce friction as it rotates within the outer housing. Additional bearings may be provided near the center of the intermediate housing if desired.

The inner framework or housing in the apparatus of FIGS. 7 through 9 includes upper longitudinal members 121 and 122, lower longitudinal members 123 and 124, right side vertical members 125, 125 and 127, left side vertical members 128, 129 and 130, top cross members 131, 132 and 133, and corresponding bottom cross members 134, 135 and 136. Not all of these members can be seen in the drawing. The inner framework or housing is mounted on horizontal axles 137 and 138. which in turn are supported between vertical members 91 and 92 and 95 and 96 on the intermediate housing and vertical members 125 and 126 and 128 and 129 on the inner housing. This permits limited vertical rotation of the inner housing with respect to the intermediate housing. Heavy tension springs 139 and 140 at the rear of the inner and intermediate housings, a counterbalance system, or other means is provided to help center the inner housing within the intermediate housing without preventing such limited rotation. Horizontal guide tubes 141 and 142 are mounted in the inner framework and are supported by braces 143, 144, 145 and 146 at the rear of the inner framework and by corresponding members at the front of the inner framework. Pulling cables 147 and 148 extend through the guide tubes and beneath sheaves 117 and 118 as shown in FIGS. 7 through 9.

FIG. 10 in the drawing illustrates the pulling yoke employed with the apparatus of FIGS. 7 and 9. This yoke comprises a yoke member 149 which is welded, clamped or otherwise affixed to pipeline 150 at the proper distance from the end of the pipeline to permit connection on the line when the yoke is seated in the apparatus. Arms 151 are mounted near the ends of the yoke and extend forward parallel to the pipeline. At the ends of the two arms are mounted detachable work sockets 153 and 154 in which cables 147 and 148 are fixed. These detachable sockets are held in place by means of pins 155 and 156. As will be pointed out later, the pins can be forced downwardly out of the sockets to permit release of the cables. Spring-loaded dogs or similar devices of the type shown in the earlier embodiment may be employed to lock the yoke and arms in place within the horizontal guide tubes if desired.

Figure 11:
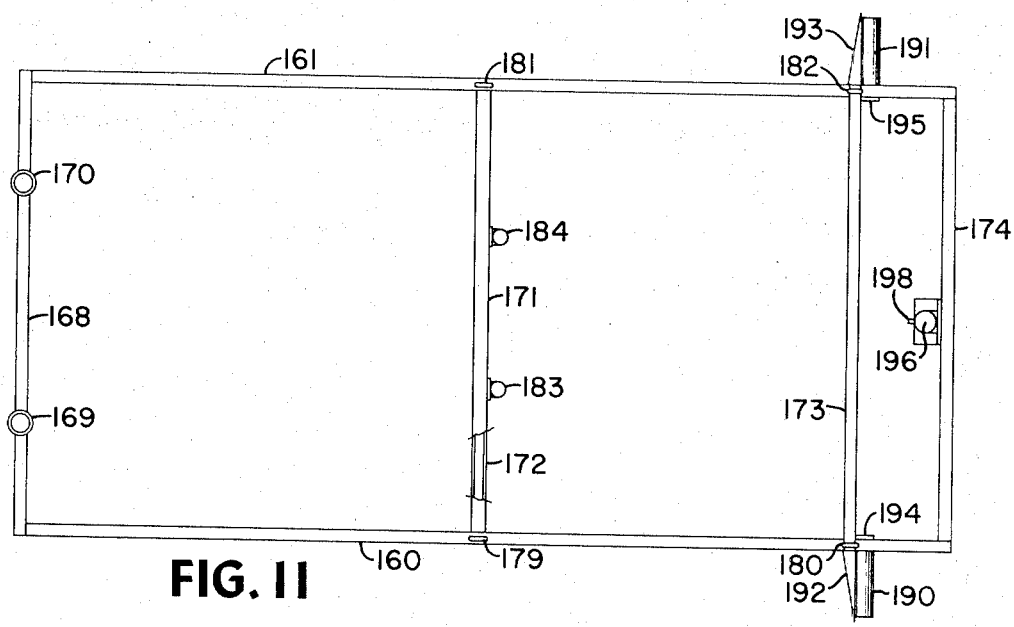
FIG. 11 is a top view of an actuating cage used with the apparatus of FIGS. 7 through 9.
Figure 12:
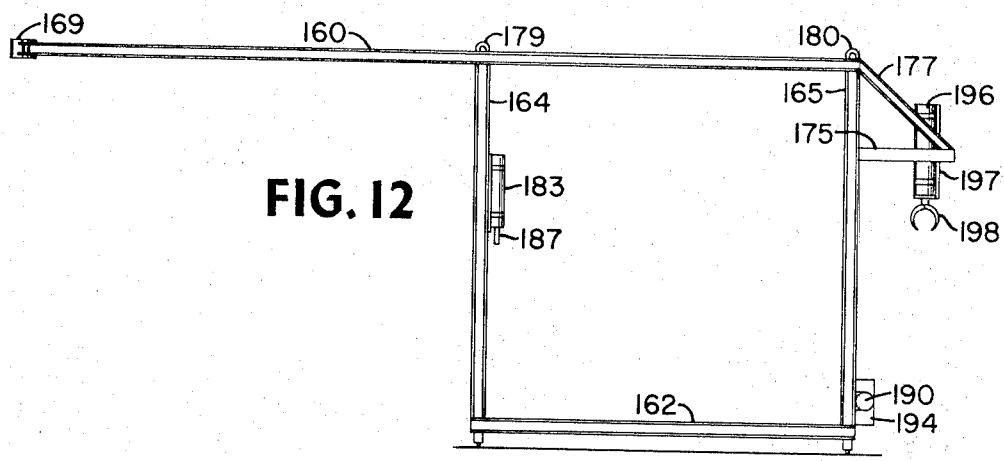
FIG. 12 is an elevation view of the cage of FIG. 11.
Figure 13:
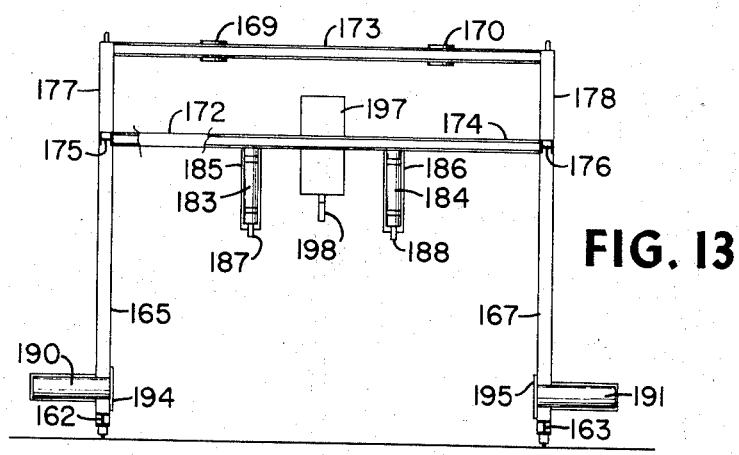
FIG. 13 is an end view of the apparatus of FIGS. 11 and 12.

FIGS. 11, 12 and 13 in the drawing illustrate an actuating cage designed for use with the apparatus of FIGS. 7 through 10. This actuating cage comprises a framework made up of upper longitudinal members 160 and 161, lower longitudinal members 162 and 163, right side vertical members 164 and 165, and corresponding left side vertical members 166 and 167. Frost cross member 168 extends between longitudinal members 160 and 161 and supports guide sleeves 169 and 170. These two sleeves are spaced so that they will slide downwardly over guide posts 76 and 77 in FIGS. 7 through 10 as the actuating cage is lowered into place. Cross members 171 and 172 extend between longitudinal members 161 and vertical members 164 and 166, respectively, near the middle of the actuating cage. Cross member 173 is located near the back of the apparatus at the upper ends of vertical members 165 and 167. At the back of the actuating cage, cross member 174 is supported by lateral members 175 and 176 and diagonal braces 177 and 178. The dimensions of these members are such that the actuator cage will slip downwardly over the outer framework of the apparatus of FIGS. 7 through 9. Padeyes 179, 180, 181 and 182 are provided for the attachment of lines to raise and lower the cage.

Hydraulic cylinders 183 and 184 are mounted on plates 185 and 186 extending downwardly from cross member 172. These cylinders are spaced so that the pins 187 and 188 attached to the piston will contact pins 155 and 156 when yoke 149 is in place and the two hydraulic cylinders are actuated. Hydraulic cylinders 190 and 191 are mounted on brackets 192 and 193 extending outwardly near the lower ends of vertical members 165 and 166. The pistons of these hydraulic cylinders are connected to plates 194 and 195 which move inwardly in response to actuation of the cylinders. The positions of the two cylinders are such that the plates will contact horizontal members 123 and 124 on the inner framework of the apparatus of FIGS. 7 through 9. At the rear of the actuating cage, hydraulic cylinder 196 is mounted in a vertical position on plate 197 which is supported from cross member 174. The piston of this latter cylinder is connected to a hydraulically actuated hook 198 which can be used to grasp padeye 157 on yoke 149 when the yoke is in position with respect to the apparatus of FIGS. 7 through 9. The hydraulic lines extending to the various cylinders are not shown in the drawing.

The apparatus of FIGS. 7 through 13 is employed in much the same manner as that shown in FIGS. 1 through 6. After the pipeline which is to be connected to an underwater wellhead or other installation has been brought up to a point near the installation, yoke 149 is mounted near the end of the pipeline in a position such that the portion of the line extending forward of the yoke will be the proper length. Cables 147 and 148 are connected to the ends of arms 151 and 152, one or more lifting bridles are attached to the pipeline behind the yoke at appropriate positions, and the end of the pipeline is then lowered into position on the ocean floor. The manipulator cage is suspended by means of cables attached to padeyes 80 from the offshore platform or floating vessel from which the pipeline connected operation is to be carried out. The ends of cables 147 and 148 are passed through horizontal guide tubes 141 and 142 in the inner framework of the manipulator, passed beneath sheaves 117 and 118, and then connected to winches onboard the platform or vessel. Guide cables 78 and 79, extending from guide posts 76 and 77 on a preinstalled guide base adjacent the wellhead or other underwater installation, are passed through guide sleeves 74 and 75 on the manipulator assembly and pulled taut by means of winches or the like. After this has been done, the manipulator assembly is slowly lowered over the guide cables and guide posts into position on the guide base. Latches 83 on the lower portion of the manipulator assembly engage padeyes 84, are pushed aside, and fall back into place under their own weight to hold the manipulator assembly in position on the guide base. Tension is then taken in pulling cables 147 and 148 to move the end of the pipeline and yoke into position with respect to the manipulator assembly.

As the end of the pipeline and the yoke move toward the assembly, the intermediate housing may be rotated about vertical axles 106 and 107 if the pipeline is not in alignment with the assembly. Similarly, the inner framework will normally rotate downwardly about horizontal axles 137 and 138 as the end of the pipeline and the yoke are pulled. This limited rotation of the inner and intermediate frameworks aids in pulling the pipeline into the proper position and reduces friction between the cables and the manipulator assembly. During the pulling operation, the end of the pipeline beyond the pulling yoke may be lifted off bottom by means of cables extending to the water's surface in order to reduce drag on the bottom and facilitate movement of the end of the pipeline into the necessary position. As the pulling operation is continued, arms 151 and 152 enter horizontal guide tubes 141 and 142, while the end of the pipeline passes between the two guide tubes. Pulling is discontinued after yoke 149 abuts against the ends of the two guide tubes. At this point, both the inner framework and the intermediate framework may be in position such that the end of the pipeline will not be aligned with the end of the corresponding pipe to which the connection is to be made.

Alignment of the end of the pipeline with the end of the pipe to which it is to be connected is facilitated by means of the actuator cage shown in FIGS. 11 through 13 of the drawing. This cage is lowered into position over the manipulator assembly shown in FIGS. 7 through 9 by means of cables attached to padeyes 179, 180, 181 and 182. The cage is lowered downwardly on guide lines 78 and 79 until sleeves 169 and 170 pass downwardly over the upper ends of guide posts 76 and 77 and the cage rests on guide base 82. As in the earlier operation, lowering of the manipulator assembly and cage, pulling of the pipeline, and alignment of the members will normally be monitored by means of an underwater lighting and television system or other monitoring equipment. After the cage is in position, hydraulic cylinder 190 and 191 will be actuated by means of hydraulic lines, not shown in the drawing, which extend to the platform or vessel from which the operation is being carried out. The extension of plates 194 and 195 by means of the hydraulic cylinders results in centering of the intermediate framework within the outer framework. By actuating the proper cylinder to the necessary degree, the intermediate and inner frameworks can be moved to either the right or the left about vertical axles 106 and 107 to permit alignment of the end of the pipeline with the end of the pipe to which the connection is to be made.

After the two ends have been approximately aligned by moving the apparatus in the horizontal, vertical alignment can be accomplished by means of hydraulic cylinder 196 and hook 198. The hook is lowered by actuating the cylinder until it engages padeye 157 on yoke 149. At this point, the hook is closed about the padeye and can be raised by means of the cylinder until the yoke, the end of the pipeline, and the inner framework of the manipulator assembly have been moved into an approximately horizontal position. The use of underwater television or similar monitoring means permits repeated adjustment by means of the hydraulic cylinders until precise alignment is obtained. Once this has been done, the remote connector to be employed can be lowered into position on a suitable running tool and used to make the connection between the end of the pipeline and the end of the corresponding pipe on the wellhead or other installation. After this has been completed, pulling cables 147 and 148 can be removed by actuating hydraulic cylinders 183 and 184 so that pins 187 and 188 punch pins 155 and 156 out of the ends of arms 151 and 152. This frees the ends of the two pulling cables and permits them to be withdrawn to the surface. The hydraulic cylinders on the actuating cage can be moved back into their original positions and the cage can then be lifted to the surface. The cables attached to the manipulator assembly can be removed or lowered to one side on the bottom for recovery by grappling if desired. The assembly itself is left in position on the guide base as a pipe support adjacent the underwater installation.

It will be understood that numerous modifications in the apparatus shown in FIGS. 7 through 13 may be made if desired. In some cases, for example, the actuator cage shown in FIGS. 11 through 13 can be dispensed with and hydraulic cylinders or other devices for positioning the inner and intermediate frameworks on the manipulator assembly can be mounted on the outer framework. In lieu of using removable pins to hold the pulling cables to the ends of the arms on the pulling yoke, the cables can be fixed in place and later removed by means of hydraulically actuated cutting devices positioned on the cage or outer framework of the manipulator assembly. A single pulling cable, guide funnel, and sheave in some cases be used in place of the dual system shown in the drawing. Spring-loaded pins or similar devices can be employed to lock the inner and intermediate cages into fixed positions after the ends of the pipeline have been aligned if desired. These and other modifications will readily suggest themselves to those skilled in the art.

Figure 14:
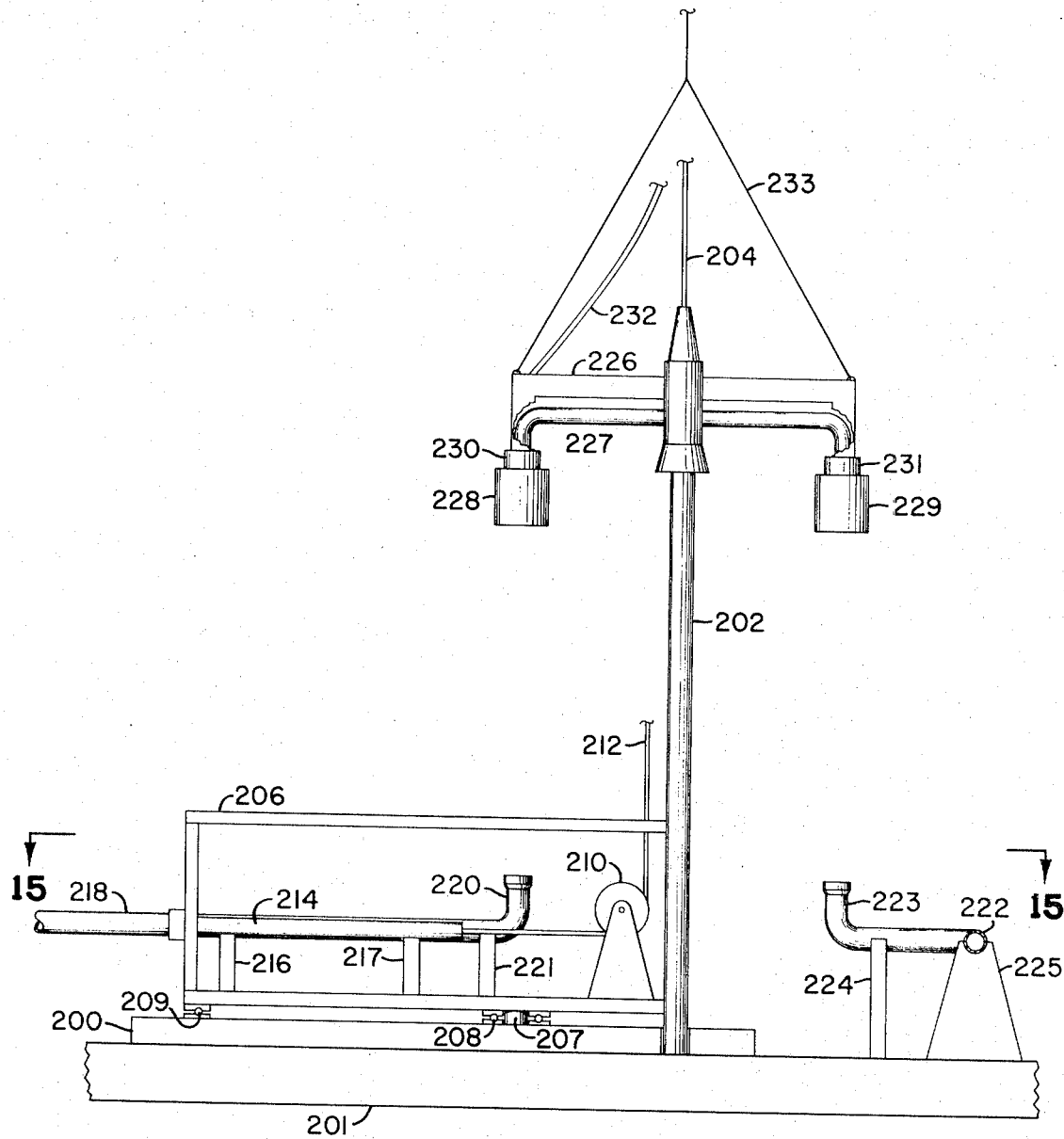
FIG. 14 is a lateral view of still another embodiment of the invention.
Figure 15:
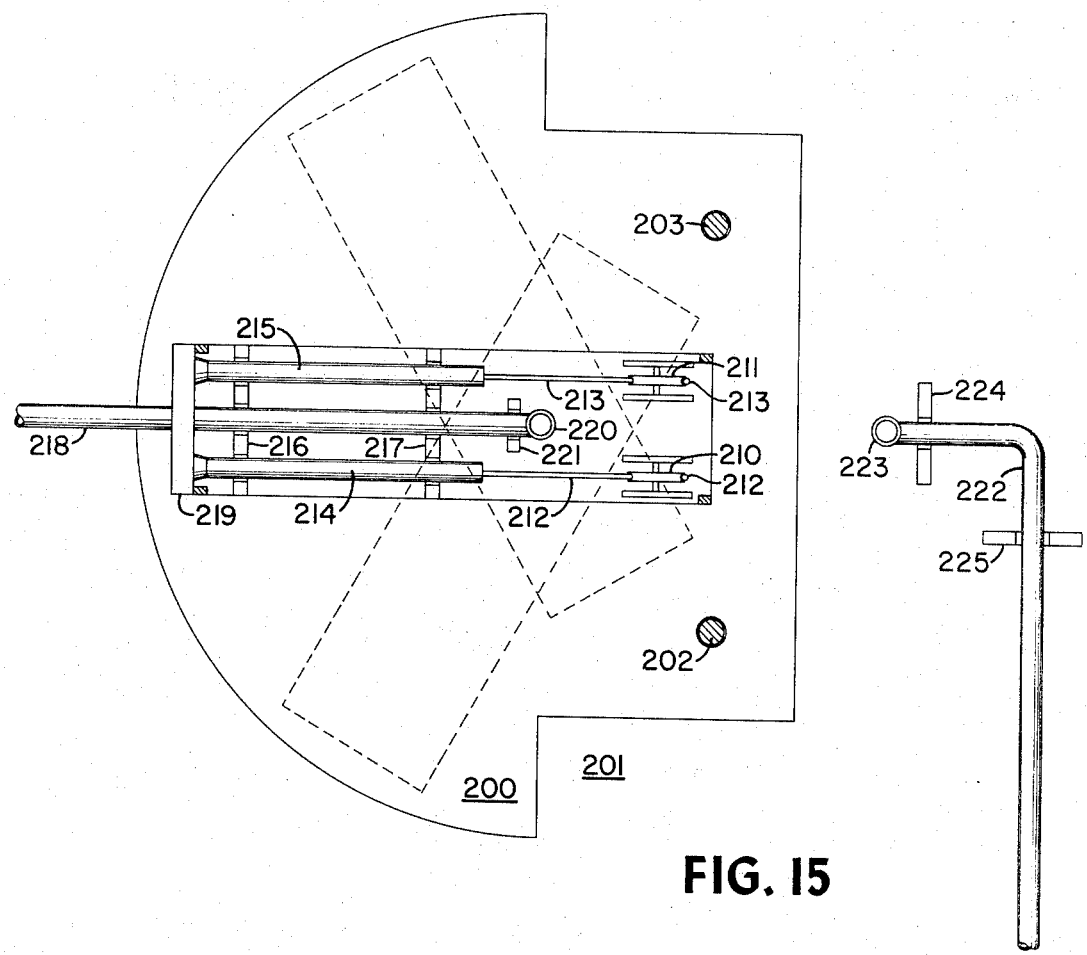
FIG. 15 is a cross sectional view of the apparatus of FIG. 14 taken about the line 15—15 in FIG. 14.

FIGS. 14 and 15 in the drawing depict still another embodiment of the invention. This embodiment employs a generally semicircular base plate 200 which is lowered into position on a preinstalled guide base 201 by means of guide posts 202 and 203 and attached guide lines 204 and 205 extending to the water's surface. A framework or housing 206 of wide flange beams or similar structural steel members is mounted on base plate 200 by means of a vertical axle 207 extending upwardly from the base plate. Bearings 208 and 209 permit rotation of the framework on the base plate about the axle as indicated by the dotted lines. Vertical sheaves 210 and 211 are mounted near the forward end of the framework to accommodate pulling cables 212 and 213. Horizontal guide tubes 214 and 215 are mounted in fixed position within the framework and held in place by brackets 216 and 217. Pipeline 218 has been pulled into position in framework 206 by means of a pulling yoke 219 which is mounted on the pipeline near the end thereof. The arms on the pulling yoke which extend into horizontal guide tubes 214 and 215 are not shown in the drawing. Cables 212 and 213 are attached to these arms. The end of the pipeline terminates in an upturned elbow 220 which extends vertically over axle 207. Bracket 221 supports the end of the pipeline between the two funnel tubes. The corresponding pipe 222 to which the pipeline 218 is to be connected is also provided with an upturned elbow 223 and is held at the proper height by supports 224 and 225.

As shown in FIGS. 14 and 15, the manipulator assembly has been lowered into place on the guide base and a remote connector assembly is being lowered into position to make up the connection. This remove connector assembly comprises a running tool 226 on which is carried a U-shaped pipe section 227 fitted with a hydraulically actuated connector 228 and 229 at each end. Detachable hydraulic pods 230 and 231 are plugged into the connectors and attached to the running tool. Hydraulic lines 232 extend to the surface to provide fluid to the assembly and may be supported on lifting cables 233 if desired. Remote connectors of this type are available commercially and will be familiar to those skilled in the art. After the remote connector has been lowered into position so that the ends of pipe section 227 engage the ends of pipeline 220 and pipe 223, the connector is actuated from the surface to complete the connection. Once this has been done, the running tool and hydraulic pods can be separated hydraulically from the pipe member and withdrawn to the surface.

The apparatus of FIGS. 14 and 15 differs from that shown earlier in that it does not include any provisions for moving the end of the pipeline about a horizontal axis. Because of the configuration of the end of the pipeline in the carriage, the use of one or more lifting bridles or similar cables on the pipe behind the yoke normally permits adequate positioning of the pipe without using an internal framework mounted on a horizontal axis. This particular embodiment of the apparatus minimizes alignment difficulties. Regardless of the direction from which the pipeline approaches the wellhead or other installation, proper alignment can readily be obtained provided that elbow 220 is positioned directly over axle 207.

I claim:

1. A method for connecting the end of an underwater pipeline to the end of a pipe at an underwater installation which comprises lowering a pipeline manipulator assembly including a movable housing into a predetermined position adjacent said underwater installation, connecting a pulling yoke to said pipeline at a point near said end thereof, pulling said end of said pipeline into position within said housing of said pipeline manipulator assembly, locking said pipeline in place within said housing, moving said pipeline and housing until said end of said pipeline is aligned with said end of said pipe, lowering a remote connector into position adjacent said end of said pipe and said end of said pipeline, and thereafter actuating said remote connector to effect a connection of said pipeline to said pipe.

2. A method as defined by claim 1 wherein said end of said pipeline is pulled into position in said housing of said pipeline manipulator assembly by pulling on a cable extending from said pulling yoke through said housing of said manipulator assembly to the water's surface.

3. A method as defined by claim 2 including the additional step of remotely disconnecting said cable from said pulling yoke after the end of the pipeline has been locked in place in said housing.

4. A method as defined by claim 1 wherein said pipeline manipulator assembly is lowered into position on a preinstalled guide base and latched to said guide base.

5. A method as defined by claim 4 wherein said manipulator assembly is lowered into place on guide lines extending to the water's surface from said guide base.

6. A method as defined by claim 1 wherein said pipeline and said housing are moved by pulling on lines extending from the pipeline to the water's surface.

7. A method as defined by claim 1 wherein said pipeline and said housing are moved by actuating hydraulic devices on said manipulator assembly.

8. A method as defined by claim 1 wherein said housing is locked in place on said manipulator assembly after the end of said pipeline has been pulled into said housing.

9. A method as defined by claim 1 wherein the position of said end of said pipeline is adjusted by moving said housing after said remote connector has been lowered into position adjacent said end and the end of said pipe.

10. Apparatus for connecting the end of an underwater pipeline to the end of a pipe at an underwater installation which comprises: a supporting member provided with means for latching said member to an underwater guide base, means for guiding said supporting member into position on said guide base adjacent said underwater installation, a housing positioned on said supporting member for rotation about a vertical axis, a guide funnel mounted in said housing in a substantially horizontal position, and a sheave mounted in said housing in front of said guide funnel for directing a cable passing through the guide funnel upwardly toward the water's surface.

11. Apparatus as defined by claim 10 which also includes means for rotating said housing about a horizontal axis.

12. Apparatus as defined by claim 10 wherein said housing contains two guide funnels extending parallel to and side-by-side one another and a sheave is mounted in front of each of said guide funnels for rotation about a horizontal axis.

13. Apparatus as defined by claim 10 wherein said supporting member comprises an outer framework, an intermediate framework is mounted in said outer framework for limited rotation therein, and said housing is mounted in said intermediate framework for limited rotation about an axis perpendicular to the axis about which said intermediate framework rotates within said outer framework and perpendicular to the longitudinal axis of said guide funnel.

14. Apparatus as defined by claim 10 wherein said means for guiding said supporting member into position comprises a pair of vertically extending guide funnels.

15. Apparatus as defined by claim 13 wherein said outer framework, said intermediate framework, and said housing are constructed of structural steel members.

16. Apparatus as defined by claim 10 including means for latching said supporting member to a preinstalled guide base.

17. Apparatus as defined by claim 10 including means for locking said housing in fixed position with respect to said supporting member.

18. Apparatus as defined by claim 13 wherein said intermediate framework is mounted for limited rotation about a horizontal axis in said outer framework and said housing is mounted for limited rotation about a vertical axis in said intermediate framework.

19. Apparatus as defined by claim 13 including means for centering the position of said housing in said intermediate framework.

* * * * *